UNITED STATES PATENT OFFICE.

CHARLES H. KIRKHAM, OF CHICAGO, ILLINOIS.

PRESERVING EGGS.

SPECIFICATION forming part of Letters Patent No. 236,598, dated January 11, 1881.

Application filed April 3, 1880. (No specimens.)

*To all whom it may concern:*

Be it known that I, CHARLES H. KIRKHAM, of Chicago, in the county of Cook and State of Illinois, have invented certain new and useful Improvements in the Art of Preserving Eggs for Food; and I do hereby declare that the following is a full, clear, and exact description of the invention, which will enable others skilled in the art to which it appertains to make and use the same.

My invention relates to improvements in the art of preserving eggs by desiccation; and the same consists in mixing a relatively small quantity of farinaceous paste, made in the ordinary manner by adding water to corn-starch, wheat-flour, rice-flour, farina, or other like substance, and subjecting the same to a sufficient degree of heat, with the material of the egg which is fit for food, then drying the mixture and pulverizing the dried product.

The object of my invention is not only to preserve the egg by desiccation, but to render it after desiccation soluble in water, either warm or cold, so that, when desired to be used, the dried product may be easily and quickly reduced back to its original liquid or semi-liquid condition before desiccation.

Paste formed by heating a mixture of water and corn-starch, wheat-flour, or other like substance to a sufficient degree, when dried, is readily soluble in either cold or warm water. By mixing a small quantity of such soluble paste with the eggs before desiccation I render the whole dried compound of egg and paste almost as readily soluble in either cold or warm water as the paste itself alone would be.

I take fresh eggs and break them into a vessel. To each dozen of eggs I add about one ounce of corn-starch paste of medium thickness, and which may be made by mixing water with corn-starch flour, subjecting the same to a sufficient degree of heat, as ordinary paste is made. Other farinaceous material of the same general nature as corn-starch may be employed in lieu thereof; but I prefer to employ corn-starch as a material for the paste, and prefer to observe the proportions above given, though the proportions given may be slightly varied. However, if the quantity of paste is increased materially, it amounts to an adulteration of the egg, and lessens the value of the product without increasing its solubility, and if the quantity of paste is materially lessened it impairs the solubility of the product. The mixture of paste and eggs is subjected to a thorough stirring until it is as nearly homogeneous as possible. The paste will appear to be taken up and absorbed by the eggs, converting the eggs into an egg-paste by absorption, making the mixture readily soluble. The mixed mass is then dried thoroughly. I prefer to do this by placing the mixture in shallow pans and placing them in a warm place so contrived that brisk currents of air shall pass constantly over the mass or mixture. Care should be taken that the heat does not rise to such a degree as to cook the eggs. When thus dried in cakes the material will keep for any length of time, and may be transported, handled, and sold in this condition. To be used, however, it must be comminuted, ground, or pulverized, and I prefer, for the sake of convenience to the user, to conclude the process at the factory by grinding, comminuting, or pulverizing the dried mass, which may be done by grinding it in a mill, pounding it in a mortar, or grating it. The resulting product may be of any degree of fineness; but I prefer that it should be ground to a fine powder, as it is more readily and easily used in that condition. This powder I pack in any suitable cases or packages, which may preferably be air-tight, but which need not be airtight, as the contents are not subject to injury from any atmosphere in any climate under ordinary circumstances.

To use the composition it is added to water, milk, or other liquid, in which it readily dissolves, the egg matter returning to its original albuminous condition. It may now be cooked as an omelet or used in any way that fresh eggs are used in the making of custards, cakes, &c. The slight admixture of farinaceous material will not be perceived, nor will it interfere in any way with the use of the eggs for any purpose.

I am aware that eggs have been preserved by desiccation without admixture; but great difficulty is experienced in dissolving the egg matter so preserved when it is desired to be used. Moreover, eggs so preserved do not keep with certainty very long.

I am also aware that eggs have been dried with an admixture of sugar, and I do not claim such method of preservation, nor is it in any wise equivalent to my process, because the eggs thus prepared with sugar cannot be used except in the preparation of sweet food, nor does the product of the sugar process dissolve so readily and quickly.

I also disclaim the process of preserving eggs consisting in mixing dry farinaceous material with the eggs before desiccation, as set forth in the English Patent No. 11,947, O. L.

I claim—

1. The process herein described for preserving eggs, consisting in adding water to farinaceous material and heating the same to near the boiling-point to form a paste, mixing such paste with the edible substance of the eggs before desiccation, in the proportion of about one ounce of the paste to each dozen eggs, drying the mixture, and pulverizing the same, substantially as specified.

2. The pulverized soluble composition of dried egg and farinaceous paste, in the proportion of about one ounce of the latter to one dozen eggs, substantially as specified.

CHAS. H. KIRKHAM.

Witnesses:
H. M. MUNDAY,
EDW. S. EVARTS.